United States Patent
Butler et al.

[15] 3,651,903
[45] Mar. 28, 1972

[54] ADJUSTABLE ROTARY DAMPER

[72] Inventors: Henry G. Butler, Houston; Irvin B. Weise, Bellaire, both of Tex.

[73] Assignee: Anderson, Greenwood & Co., Houston, Tex.

[22] Filed: Aug. 21, 1969

[21] Appl. No.: 852,022

[52] U.S. Cl. ............................................................188/290
[51] Int. Cl. ......................................................F16d 57/02
[58] Field of Search ....................................188/271, 290

[56] References Cited

UNITED STATES PATENTS

| 2,514,137 | 7/1950 | O'Connor | 188/290 |
| 2,714,946 | 8/1955 | Tenot et al. | 188/290 UX |
| 3,424,406 | 1/1969 | Rumsey et al. | 188/290 X |
| 3,329,246 | 7/1967 | Kaplan | 192/58 B |

FOREIGN PATENTS OR APPLICATIONS

| 1,466,314 | 12/1966 | France | 188/290 |

*Primary Examiner*—George E. A. Halvosa
*Attorney*—J. Vincent Martin, Joe E. Edwards and Jack R. Springgate

[57] ABSTRACT

A rotary damper having rotor and spacer plates with relatively close spacing therebetween and a viscous fluid to provide a fluid coupling between the rotor and stator plates and a combination with the damper connected to damp the movement of the valve member of a swing check valve.

6 Claims, 5 Drawing Figures

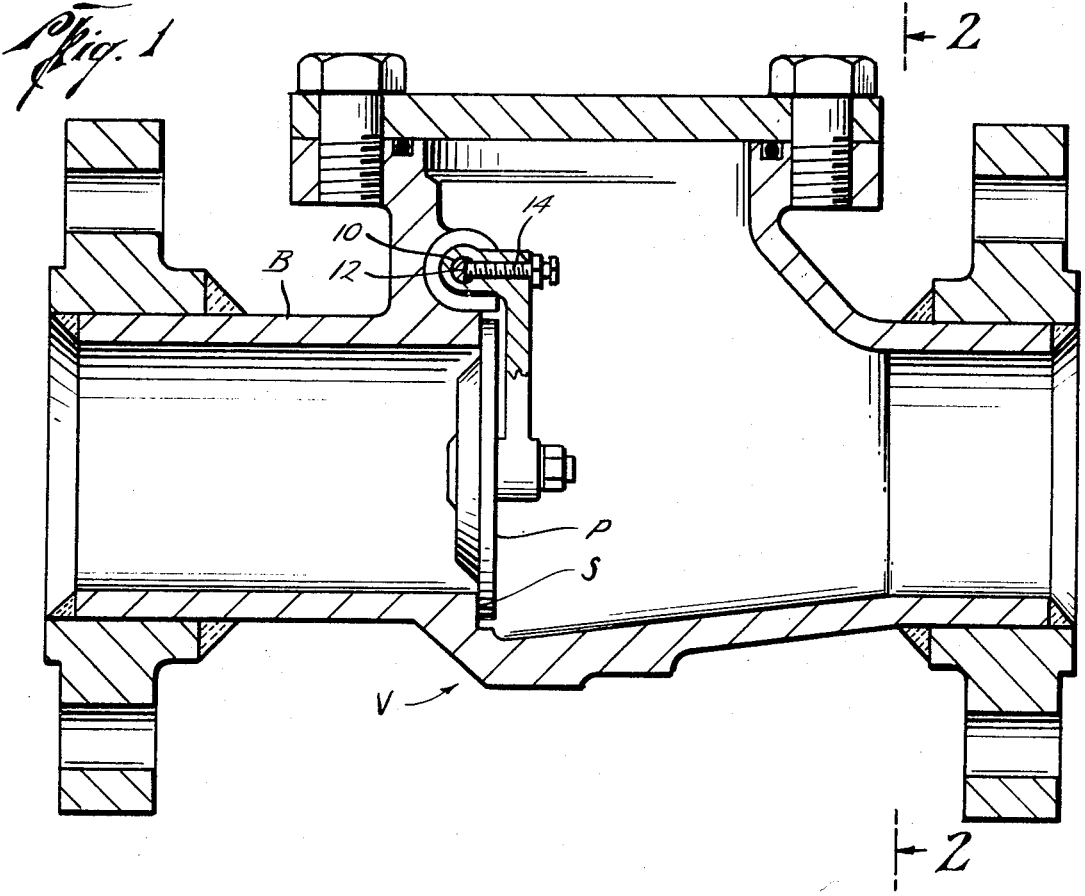
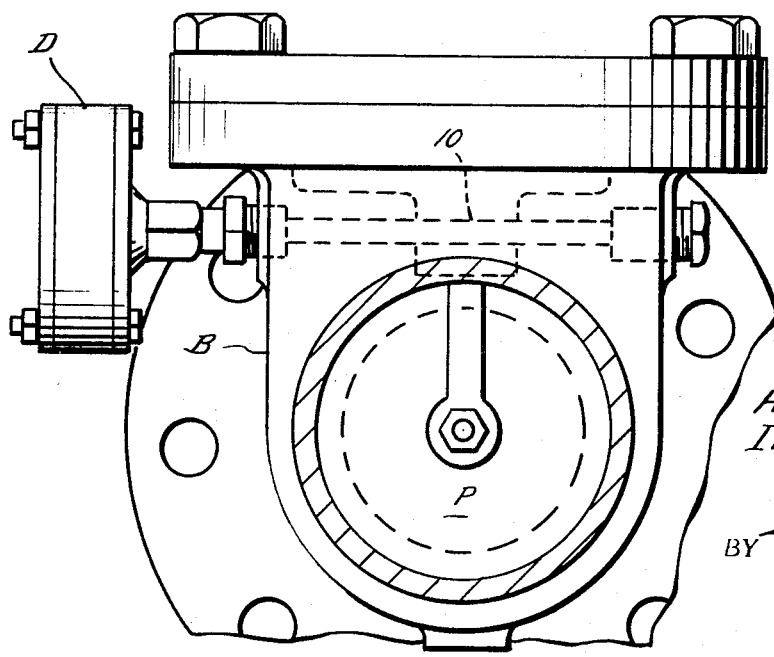

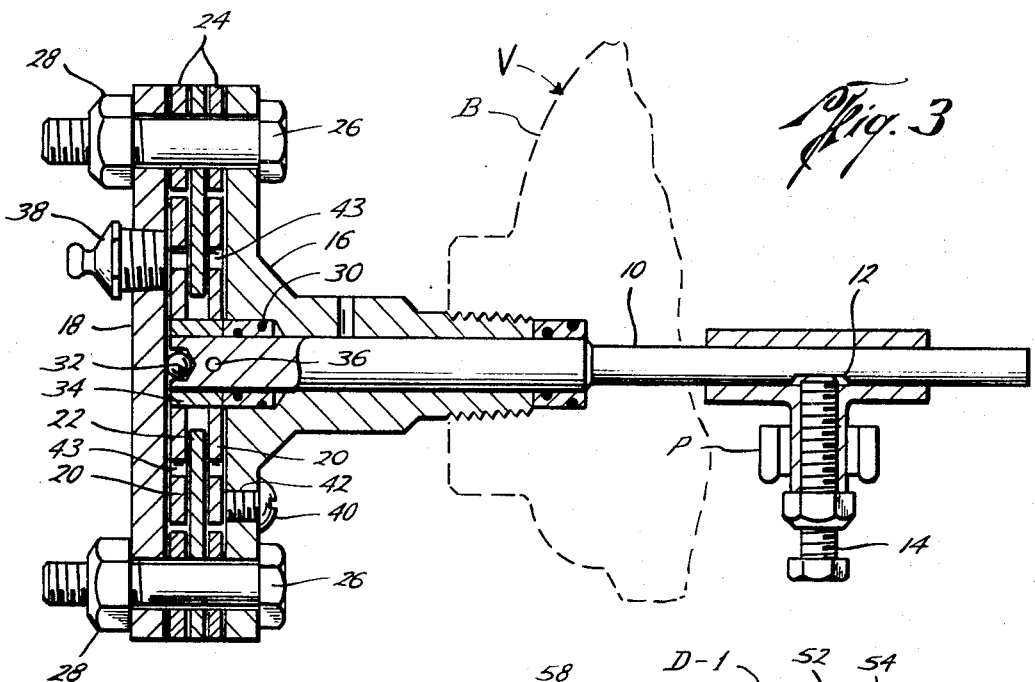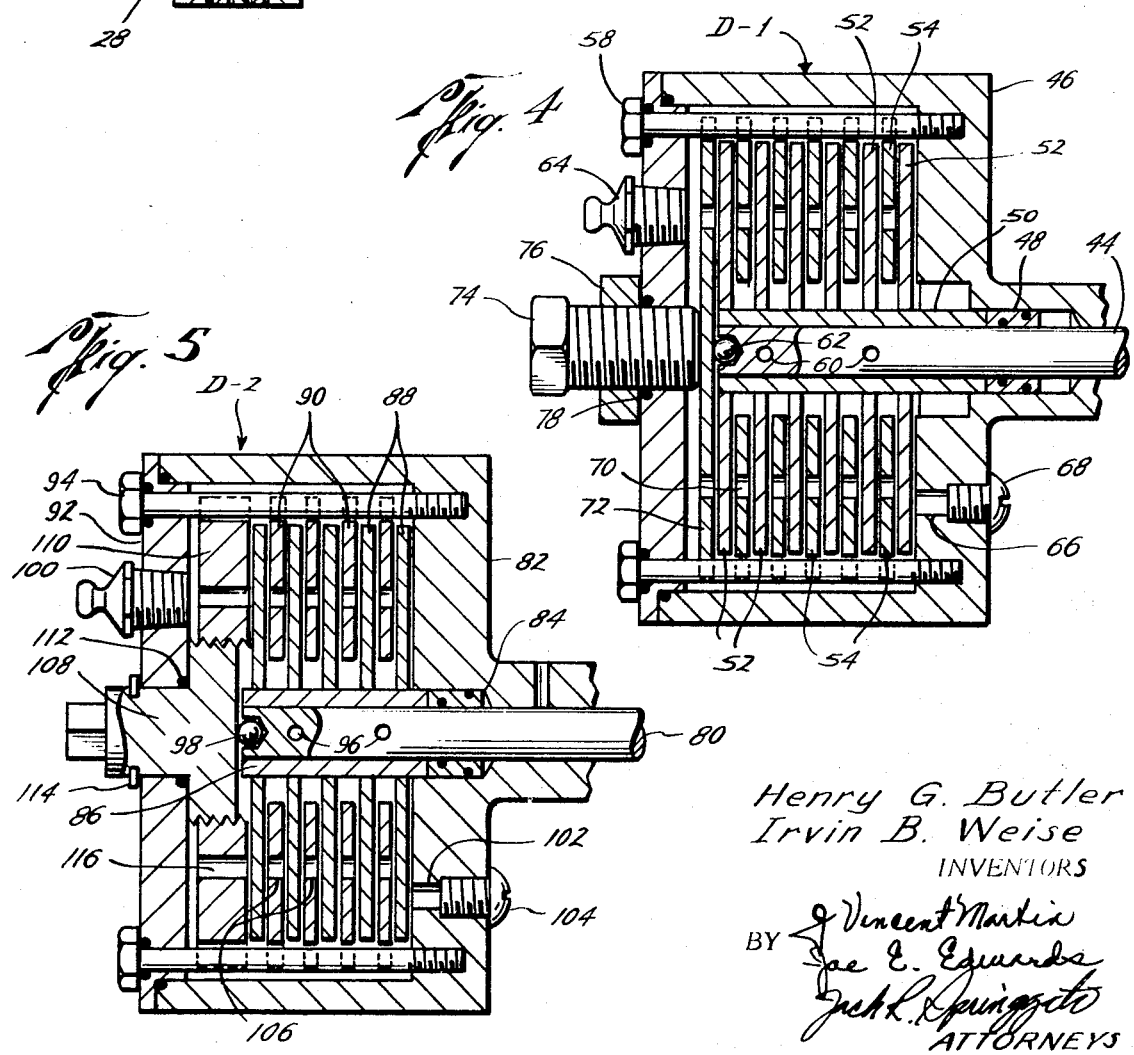

ADJUSTABLE ROTARY DAMPER

The present invention relates to an improved rotary damper and to a swing check valve having the improved rotary damper thereon to damp movement of the swing valve member.

An object of the present invention is to provide an improved rotary damper which is composed of relatively simple parts so that it is simple and inexpensive to manufacture.

Another object is to provide an improved rotary damper with a variable torque resistance.

A further object is to provide an improved rotary damper for a swing check valve which dampens pulsating movements of the check valve while allowing the check valve to function with relatively seating force.

Still another object is to provide an improved rotary damper which is constructed from a plurality of flat plates, a shaft and some fasteners.

BRIEF DESCRIPTION OF THE DRAWINGS

These and other objects of the present invention are hereinafter described and explained with respect to the structures illustrated in the drawings wherein:

FIG. 1 is a sectional view of a swing check valve.

FIG. 2 is a plan view of the swing check valve shown in FIG. 1 illustrating the mounting of the improved rotary damper of the present invention thereon.

FIG. 3 is a sectional view of one form of rotary damper of the present invention and illustrates the shaft connection to the shaft of the swing check valve.

FIG. 4 is a sectional view of a modified form of improved rotary damper of the present invention illustrating the structure varying its torque.

FIG. 5 is a sectional view of another modified form of improved rotary illustration of the structure for varying its torque.

DESCRIPTION OF THE PREFERRED EMBODIMENTS

The improved rotary damper of the present invention may be used with any device which requires rotary damping with a minimum of resisting torque. One particular useful combination is the improved rotary damper and a swing check valve shown in the drawings.

The swing check valve V has a body B with a passageway therethrough. The valve seat S surrounding the passageway and a valve member or plug P pivotally mounted in the body B by the shaft 10 is adapted to move into and from seated engagement with the valve seat S. Shaft 10 includes a flat portion 12 and screw 14 secures the plug P to the shaft 10 by engagement with the flat 12 as best seen in FIG. 3. The plug P is normally biased toward seated engagement on the seat S either by a light spring or by gravity. The ends of shaft 10 are supported for rotation in the body B and one end of shaft 10 extends into damper D. The damper D is constructed as hereinafter set forth and functions to damp oscillations and chatter of the plug P when it is subjected to pulsating conditions. Damping of such oscillations and chatter of the plug P is provided to prevent the excessive wear while permitting the closing of the valve plug under a light spring seating force or a very low back pressure.

The damper D includes the body 16 through which the shaft 10 extends, the cover plate 18, rotor plates 20, stator ring 22, spacer rings 24 secured together by the bolts 26 and nuts 28. Seal ring 30 provides a seal between the interior of damper body 16 and the exterior of shaft 10. The end of shaft 10 is recessed to receive the thrust bearing ball 32. Thrust bearing ball 32 transmits shaft thrust resulting from one end of shaft 10 being exposed to the pressure within swing check valve V while the other end extends through the body B and into damper D. The outer portion of the damper body 16 is threaded into the check valve body B. The rotor plates 20 are secured to rotate with the shaft 10 by the sleeve 34. Sleeve 34 is secured to shaft 10 by the pin 36 and has an outer configuration, i.e., square or hexagonal to secure rotor plates 20 for rotation with shaft 10.

The damper D is filled with a viscous fluid, preferably one which has a stable viscosity over a wide range of temperatures. One fluid which has been found to be very successful is a silicone fluid marketed by Dow Corning Corp. under the designation DC 200. Fluids having viscosities in the range of viscosities from 50,000 to 100,000 centistokes have been used. Selection of the fluid viscosity is made to provide the desired torque resistance of the damper D. The fluid is pumped into the damper D through the fitting 38 with screw 40 removed from the vent 42. Filling may be accomplished with a hand-operated grease gun or in any suitable manner. Rotation of shaft 10 during filling assists in the removal of air. The damper D is provided with suitable seals between each of plates 18, 24, 22 and body 16 to retain the fluid within damper D. Also, the rotor plate 20 defines holes 43 which are provided to assist in the distribution of the fluid through damper D.

With the damper D as described, the rotation of shaft 10 caused by movement of valve plug P is resisted by the resistance of the fluid to the rotation of the rotor plates. This resistance to rotation of the rotor plates varies with the surface area of the rotor plates and stator rings, the speed of rotation, the effective radius of the surface areas, the viscosity of the fluid and the spacing between the plates.

From this, it can be seen that the resistance to rotation can be varied by varying the number of rotor plates 20 and stator rings 22 included in damper D with a change of shaft 10 and sleeve 34 to provide a shaft and sleeve of the proper length to accommodate the plates 20 and rings 22. For example, adding two additional rotor plates 20 and stator rings 22 to the damper D shown in FIG. 3 increases the surface areas exposed to the fluid resistance and thereby increases the resistance to rotation of the damper D. Also an increase in the diameter of rotor plates 20 and a commensurate increase in size of the remainder of damper D would both increase the surface area and also increase the effective radius of the surface area with both such increases causing an increase in the resistance to rotation of the damper D. In addition to changing fluids, the other manner of changing the resistance to rotation of damper D is to change the spacing between the rotor plates 20 and the stator rings 22. For example, if an increase in the resistance to rotation is desired, a thicker stator ring 22 could be used to thereby decrease the rotor-stator spacing and increase resistance to rotation of the damper D.

In certain installations, it might be desirable to be able to vary the resistance to rotation of the damper without changing the fluid or parts. In such installations, one of the dampers D-1 and D-2 illustrated in FIGS. 4 and 5 respectively, should be provided. Both of these dampers provide an external adjustment to vary the rotor-stator spacing without changing parts.

The damper D-1 shown in FIG. 4 includes the shaft 44 extending into the housing 46 with seal ring 48 sealing between shaft 44 and housing 46, the rotor sleeve 50 supporting the rotor plates 52 for rotation with shaft 44, the stator rings 54, the cover plate 56, the connecting bolts 58, and the means for adjusting the rotor-stator spacing. The housing 46, and the cover plate 56 are secured together to define the fluid chamber. The sleeve 50 is secured on shaft 44 by the pins 60 and has a square outer configuration for engaging the rotor plates 52 to assure that they rotate with shaft 44 while allowing them to move axially of shaft 44. The portion of sleeve 50 which is adjacent to seal ring 48 has a circular outer configuration. The end of shaft 44 defines the recess in which the thrust ball 62 is positioned. The stator rings 54 have notches at their outer periphery through which bolts 58 extend so that stator rings 54 are slidably mounted on sleeve 50 but are prevented from rotating by bolts 58. The fitting 64 provides the inlet to the fluid chamber, the vent 66 is closed by screw 68 so that as the chamber is being filled with fluid, the air is vented through vent 66 with screw 68 removed. Stator rings 54 each include a plurality of holes 70 to assist in the distribution of fluid in the chamber of damper D1.

The means for adjusting the rotor-stator spacing which adjusts the resistance torque of the damper D-1 includes the plate 72 which is slidably supported on bolts 58 and the screw 74 extending through cover plate 56 in threaded engagement therewith to engage the plate 72 and force it inwardly. Lock nut 76 on screw 74 locks the setting of the adjusting means and thread seal 78 prevents leakage of fluid through cover plate 56.

It is generally preferred that the diameter of screw 74 be approximately the diameter of shaft 44 or that some means be provided to compensate for volume changes resulting from the actuation of said adjusting means. In the damper D-1, such compensation is provided by the extended length of the recess defined by housing 46 in which seal ring 48 is positioned. Thus, if the volume in the chamber is changed by movement of screw 74, the seal ring 48 is free to move in its recess to compensate for such change.

Another result of such torque adjustment is the movement of shaft 44 caused by the movement of plate 72. Thus, shaft 44 is free to slide through seal ring 48 and housing 46 and should be provided with a lost motion connection (not shown) externally of housing 46 which connection transmits all rotary motion but allows axial movement of shaft 44 without incurring axial movement of connecting part such as a valve plug shaft. Thus, with a connection of damper D-1 to a check valve, the shaft 44 could be connected to the plug by a splined connection allowing the shaft to slide therethrough without interferring with the rotation of shaft 44 with the movement of the plug.

By looking at FIG. 4, it can be seen that as screw 74 is rotated to move further through cover plate 56 into the fluid chamber it moves plate 72 across the chamber to the right in the figure causing shaft 44, sleeve 50 and seal ring 48 also to move to the right. This movement thus reduces the space available to the rotor plates 52 and the stator rings 54. Since both rotor plates 52 and stator rings 54 are mounted for freedom of movement in an axial direction, the movement of the plate to the right reduces the rotor-stator spacing to increase the torque setting or resistance to rotation of the damper D-1. Also, threading the screw 74 outwardly allows the plate 72 to be moved to the left in the figure thus increasing the rotor-stator spacing to decrease the torque setting of damper D-1.

The damper D-2 shown in FIG. 5 is quite similar to damper D-1 except that it includes an adjusting means which does not move the shaft or change the volume of the fluid chamber when the torque setting is varied by such adjusting means. The damper D-2 includes the shaft 80 extending through the housing 82 with the seal ring 84 sealing between shaft 80 and housing 82, the rotor sleeve 86 supporting the rotor plates 88 for rotation with shaft 80, the stator rings 90, the cover plate 92, the connecting bolts 94 and the means for adjusting the rotor-stator spacing. The housing 82 and the cover plate 92 are secured together by bolts 94 to define the fluid chamber. The sleeve 86 is secured to the shaft 80 by the pins 96 and has a square outer configuration for engaging rotor plates 88 to assure that they rotate with shaft 80 while allowing them to move axially of shaft 80. The portion of sleeve 86 which is adjacent to seal ring 84 has a circular outer configuration to allow it to rotate within the recess in housing 82. The end of shaft 80 defines the recess in which thrust ball 98 is positioned. The stator rings 90 have notches at their outer periphery through which bolts 94 extend so that stator rings 90 are slidably mounted on sleeve 86 but are prevented from rotating by bolts 94. The fitting 100 provides the inlet to the fluid chamber. The vent 102 is closed by the screw 104. As the chamber is being filled with fluid through fitting 100, the air is vented through vent 102 with screw 104 removed. Rings 90 each include a plurality of holes 106 to assist in the distribution of fluid in the chamber of damper D-2.

The means for adjusting the rotor-stator spacing which thereby adjusts the resistance torque of damper D-2 includes the hub 108 and the ring 110. Hub 108 extends through cover plate 92 with suitable seal 112 to prevent leakage of fluid. The portion of hub 108 within the fluid chamber extends radially outward and is threadedly engaged at its outer periphery with the inner periphery of ring 110. Snap ring 114 engages hub 108 on the exterior of cover plate 92 to retain hub 108 in its position while allowing it to be rotated. The outermost portion of hub 108 is square or other suitable configuration to allow the hub 108 to be rotated by a wrench. The annular ring 110 defines the holes 116 which assist in complete distribution of fluid throughout the fluid chamber. Also, ring 110 includes exterior notches which engage the bolts 94 to prevent the ring 110 from rotating but allowing it to move axially in the fluid chamber.

By reference to FIG. 5, it can be seen that when hub 108 is rotated to thread ring 110 to the right, the space available for the rotor plates 88 and the stator rings 90 is reduced, reducing the rotor-stator spacing to thereby increase the torque setting or resistance to rotation. This is accomplished without axial movement of shaft 80 and without a change of volume of the fluid chamber. The torque setting may be reduced by rotating hub 108 to thread ring 110 to the left in the figure to increase the rotor-stator spacing.

It is believed since the rotor-stator spacing affects the resistance to rotation and all of the rotor plates and stator rings are free to move axially that after each adjustment, the plates and rings move axially to the position of least resistance to rotation and are thereby uniformly spaced along the shaft on which they are mounted.

From the foregoing it can be seen that the improved damper of the present invention is of simple structure which is inexpensive to manufacture and easy to assemble. This improved damper as shown in FIGS. 4 and 5 includes an adjustment of the torque setting which is operable from the exterior of the damper. The combination of the swing check valve and improved damper provides a novel structure in which chattering and oscillations of the valve are damped and the valve closes under a light spring pressure or a very low back pressure.

What is claimed is:

1. A damper, comprising
    a housing,
    a shaft extending into said housing,
    a cover secured to said housing to define a fluid chamber within said housing,
    at least one rotor plate connected to said shaft and adapted to rotate therewith within said fluid chamber,
    at least one stator ring connected to said housing within said fluid chamber so that the stator ring is held stationary and is positioned in close spaced side-by-side relationship to said rotor plate,
    filling means communicating with said fluid chamber,
    a fluid substantially filling said fluid chamber and the space between said rotor plate and said stator ring to provide a fluid coupling between said rotor plate and said stator ring whereby rotation of said shaft is resisted by the fluid coupling between said rotating rotor plate and said stationary stator ring,
    an adjusting ring secured within said fluid chamber against rotation and adapted to engage the outermost of the stator ring and rotor plate,
    a hub extending through said cover, being rotatable therein, and being threadedly engaged within said adjusting ring, and
    means preventing axial movement of said hub in said cover so that rotation of said hub moves said adjusting ring axially of said shaft to adjust the rotor plate stator ring spacing without changing the volume in said fluid chamber.

2. A damper, comprising a housing, a shaft extending into said housing, a cover secured to said housing to define a fluid chamber within said housing, at least one rotor plate connected to said shaft and adapted to rotate therewith within said fluid chamber, at least one stator ring connected to said housing within said fluid chamber so that the stator ring is held stationary and is positioned in close spaced side-by-side relationship to said rotor plate, spacer rings positioned on each side of said stator ring, said spacer rings, said stator ring, said housing and said cover solely defining said fluid chamber, filling means communicating with said fluid chamber, a fluid substantially filling said fluid chamber and the space between each of said rotor plates and each of said stator rings to provide a fluid coupling between said plate and said ring whereby rotation of said shaft is resisted by the fluid coupling between said rotating rotor and said stationary stator ring, the end of said shaft defining a recess, and a ball bearing positioned within said recess and engaging a wall of said fluid chamber to minimize the friction of shaft rotation.

3. A damper, comprising a housing, a shaft extending into said housing, a cover secured to said housing to define a fluid chamber within said housing, at least one rotor plate connected to said shaft and adapted to rotate therewith within said fluid chamber, at least one axially adjustable stator ring connected to said housing within said fluid chamber so that the stator ring is held stationary and is positioned in close spaced side-by-side relationship to said rotor plate, filling means communicating with said fluid chamber, a fluid substantially filling said fluid chamber and the space between each of said rotor plates and each of said stator rings to provide a fluid coupling between said plate and said ring whereby rotation of said shaft is resisted by the fluid coupling between said rotating rotor and said stationary stator ring, the end of said shaft defining a recess, and a ball bearing positioned within said recess and engaging said stator ring and the bottom of said recess to minimize the friction of shaft rotation.

4. A damper according to claim 3, wherein said rotor plate is slidably mounted on said shaft, said stator ring is slidably mounted for movement in a direction which is axially of said shaft, and including means for adjusting the spacing between said rotor plate and said stator ring from the exterior of said housing and cover whereby changes in spacing of said plate and ring does not result in a change in volume in said fluid chamber.

5. A damper according to claim 3, wherein said housing defines a bore through which said shaft extends and a counterbore on the inside of said housing, and a seal ring surrounding said shaft and positioned within said counterbore for sealing between said housing and said shaft.

6. A damper according to claim 3, including a sleeve surrounding and secured to the portion of said shaft within said fluid chamber, the exterior of said sleeve being shaped to receive said rotor plate in rotational driving engagement while allowing said plate to move axially therealong.

* * * * *